(12) United States Patent
Watari et al.

(10) Patent No.: US 10,587,862 B2
(45) Date of Patent: Mar. 10, 2020

(54) HEAD-MOUNTED DEVICE

(71) Applicant: SONY INTERACTIVE ENTERTAINMENT INC., Tokyo (JP)

(72) Inventors: Yasuhiro Watari, Tokyo (JP); Takayuki Ishida, Tokyo (JP); Akira Suzuki, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/083,208

(22) PCT Filed: Feb. 9, 2017

(86) PCT No.: PCT/JP2017/004759
§ 371 (c)(1),
(2) Date: Sep. 7, 2018

(87) PCT Pub. No.: WO2017/163648
PCT Pub. Date: Sep. 28, 2017

(65) Prior Publication Data
US 2019/0089946 A1    Mar. 21, 2019

(30) Foreign Application Priority Data
Mar. 23, 2016  (JP) .................................. 2016-058693

(51) Int. Cl.
*H04N 13/239* (2018.01)
*H04N 13/271* (2018.01)
(Continued)

(52) U.S. Cl.
CPC ........... *H04N 13/239* (2018.05); *G06F 3/017* (2013.01); *G06K 9/00375* (2013.01);
(Continued)

(58) Field of Classification Search
CPC .. H04N 13/239; H04N 5/2257; H04N 13/344; G06T 7/285; G06T 7/593; G06K 9/3233
See application file for complete search history.

(56) References Cited

U.S. PATENT DOCUMENTS

| 6,346,929 B1 | 2/2002 | Fukushima et al. |
| 2015/0077520 A1 | 3/2015 | Ohba et al. |

(Continued)

FOREIGN PATENT DOCUMENTS

| JP | 8-6708 A | 1/1996 |
| JP | 2013-242812 A | 12/2013 |
| JP | 2016-38889 A | 3/2016 |

OTHER PUBLICATIONS

International Search Report and Written Opinion dated Apr. 18, 2017, from International Application No. PCT/JP2017/004759, 9 sheets.

(Continued)

*Primary Examiner* — Thai Q Tran
*Assistant Examiner* — Jose M Mesa
(74) *Attorney, Agent, or Firm* — Katten Muchin Rosenman LLP

(57) ABSTRACT

Provided is a head-mounted device that includes a housing, first imaging means, and second imaging means. The housing is to be mounted on the head of a user. The first and second imaging means are mounted on the housing to capture images from different angles of view. The head-mounted device receives an image captured by the first imaging means, detects an image portion corresponding to a body portion of the user from the received image, and estimates, based on information indicative of the detected image portion, a possible existence range of a predetermined part of the body of the user within an image captured by the second imaging means.

5 Claims, 5 Drawing Sheets

(51) Int. Cl.
*H04N 13/344* (2018.01)
*G06T 7/73* (2017.01)
*G06T 7/285* (2017.01)
*G06T 7/593* (2017.01)
*H04N 5/225* (2006.01)
*G06K 9/00* (2006.01)
*G06F 3/01* (2006.01)
*G06K 9/32* (2006.01)
*H04N 5/232* (2006.01)
*H04N 13/00* (2018.01)

(52) U.S. Cl.
CPC ............ *G06T 7/285* (2017.01); *G06T 7/593* (2017.01); *G06T 7/73* (2017.01); *H04N 5/2257* (2013.01); *G06K 9/3233* (2013.01); *G06T 2207/10021* (2013.01); *G06T 2207/10028* (2013.01); *G06T 2207/30196* (2013.01); *H04N 5/23219* (2013.01); *H04N 13/271* (2018.05); *H04N 13/344* (2018.05); *H04N 2013/0081* (2013.01); *H04N 2013/0085* (2013.01)

(56) References Cited

U.S. PATENT DOCUMENTS

| | | | |
|---|---|---|---|
| 2015/0244910 A1* | 8/2015 | Marston | G02C 11/10 348/294 |
| 2016/0044298 A1 | 2/2016 | Holz et al. | |
| 2017/0213471 A1* | 7/2017 | Breed | G02B 27/0172 |

OTHER PUBLICATIONS

International Preliminary Report on Patentability dated Sep. 25, 2018, from International Application No. PCT/JP2017/004759, 13 sheets.

* cited by examiner

FIG. 6
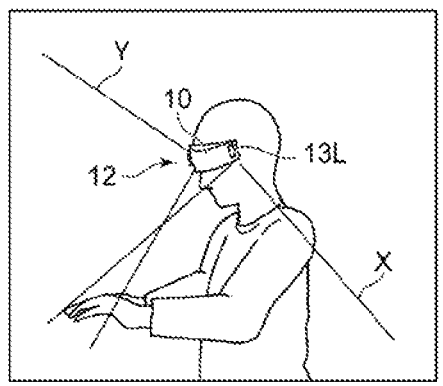
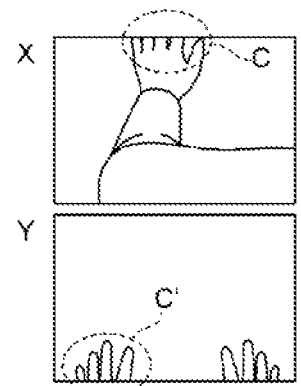
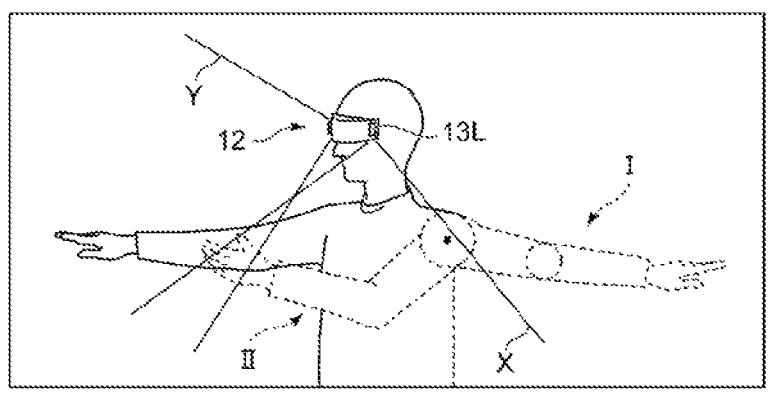
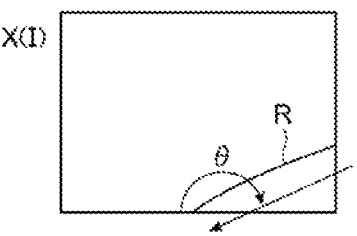
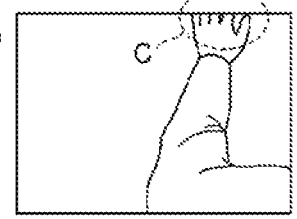
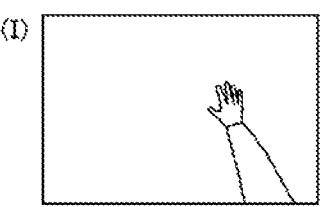
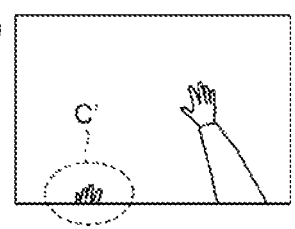

HEAD-MOUNTED DEVICE

TECHNICAL FIELD

The present invention relates to a head-mounted device that is used while it is mounted on the head of a user.

BACKGROUND ART

A device that is used while it is mounted on the head of a user (head-mounted device) is known and called, for example, a head-mounted display or a smart glass. This type of head-mounted device presents an image to the user by forming the image in front of the eyes of the user.

SUMMARY

Technical Problem

In a situation where the head-mounted device, such as a head-mounted display, is used to display images for a game, it is demanded that the motion, for example, of a hand of the user wearing the head-mounted device be detected. However, the motion of the user was previously detected based only on an input from a controller or other similar device.

The present invention has been made in view of the above circumstances. An object of the present invention is to provide a head-mounted device that is capable of efficiently detecting the motion of a user without requiring any operation of a controller.

Solution to Problem

A head-mounted device according to the present invention includes a housing, first imaging means, second imaging means, detection means, and estimation means. The housing is to be mounted on the head of a user. The first imaging means and the second imaging means are mounted on the housing to capture images from different angles of view. The detection means receives an image captured by the first imaging means and detects an image portion corresponding to a body portion of the user from the received image. The estimation means estimates, based on information indicative of the detected image portion, a possible existence range of a predetermined part of the body of the user within an image captured by the second imaging means. The head-mounted device detects an image portion corresponding to the predetermined part of the body of the user from the estimated possible existence range within the image captured by the second imaging means.

BRIEF DESCRIPTION OF DRAWINGS

FIG. 6 is a diagram illustrating an operational overview of the head-mounted device according to an embodiment of the present invention.

DESCRIPTION OF EMBODIMENT

An embodiment of the present invention will now be described with reference to the accompanying drawings. The following description assumes that a head-mounted device according to the embodiment of the present invention is a head-mounted display. However, the head-mounted device according to the present embodiment need not always be a head-mounted display. The head-mounted device according to the present embodiment may be a headphone, a headband, or any other device that is to be mounted on the head of a user.

Figure 1:
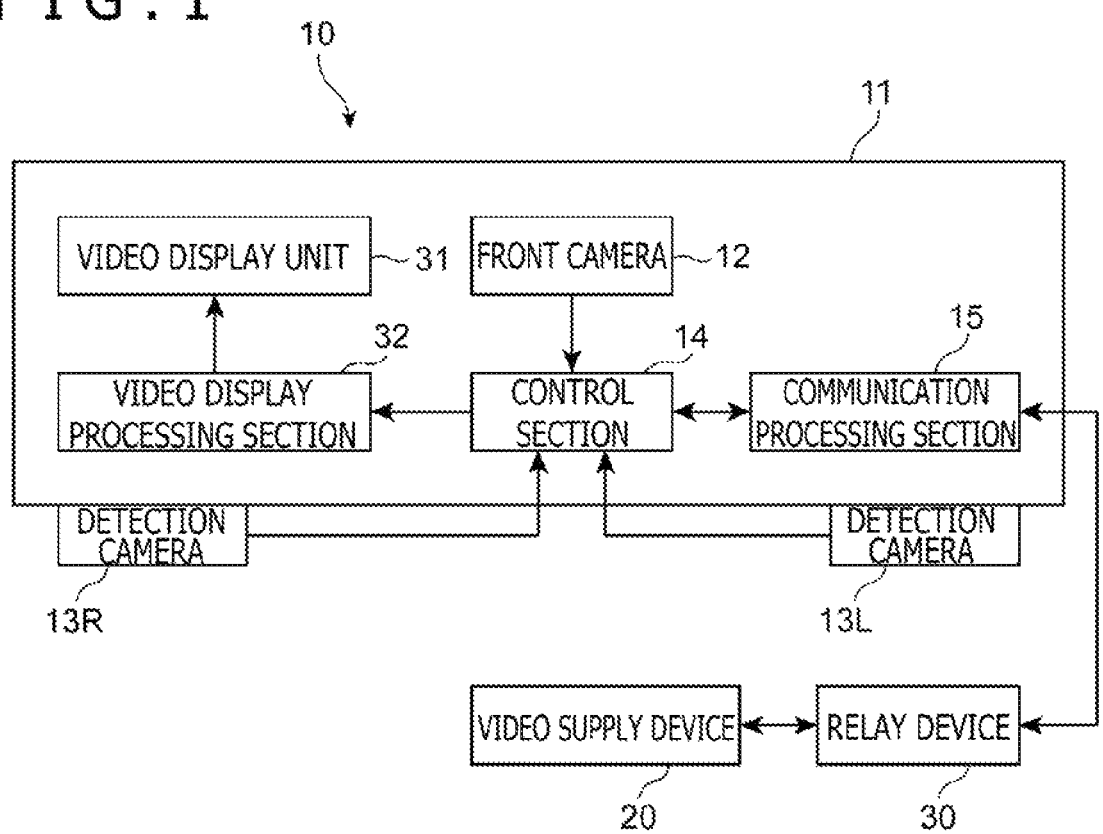
FIG. 1 is an overall schematic diagram illustrating a video display system according to an embodiment of the present invention.

FIG. 1 is an overall schematic diagram illustrating an information processing system 1 including the head-mounted device 10 according to an embodiment of the present invention. The information processing system 1 according to the present embodiment includes the head-mounted device 10, a video supply device 20, and a relay device 30.

In one example of the present embodiment, the head-mounted device 10 is a video display device that is used while it is mounted on the head of the user. The head-mounted device 10 in the present example displays an image and presents it to the user in accordance with a video signal inputted from the later-described relay device 30. In the present embodiment, the head-mounted device 10 is applicable to a situation where video is viewed with left and right eyes. Therefore, the head-mounted device 10 may display mutually independent videos in front of the left and right eyes of the user.

The head-mounted device 10 includes a housing 11, a front camera 12, detection cameras 13L and 13R, a control section 14, and a communication processing section 15. The housing 11 accommodates a video display unit 31 and a video display processing section 32, and is to be mounted on the head of the user. The front camera 12 is mounted on the front surface of the housing 11 (the front surface is positioned in a direction corresponding to the line-of-sight direction of the user wearing the head-mounted device 10). The detection cameras 13L and 13R are mounted on the respective left and right lateral surfaces of the housing 11.

The video display unit 31 includes, for example, a display element for displaying left-eye video and a display element for displaying right-eye video. The display elements may be, for example, liquid-crystal displays or organic electroluminescence (EL) display panels. The user wearing the head-mounted device 10 views the left-eye video with a left eye and views the right-eye video with a right eye.

In accordance with signals supplied from the video display processing section 32, the video display unit 31 displays video on the left-eye and right-eye display elements on an independent basis.

The video display processing section 32 includes a circuit that outputs a video signal to the video display unit 31 in accordance with a video signal that is inputted from the relay device 30 through the communication processing section 15.

The front camera 12 is disposed on the front surface of the housing 11 for the head-mounted device 10 in order to capture an image depicting a forward view from the user and outputs the captured image to the control section 14. It is assumed that the front surface of the housing 11 is positioned in a direction corresponding to the line-of-sight direction of the user wearing the head-mounted device 10. In the present embodiment, the front camera 12 implements second imaging means.

The detection cameras 13L and 13R (these cameras are hereinafter referred to as the detection cameras 13 if they need not be discriminated from each other) capture videos from angles of view that are different from the angle of view of the front camera 12. The detection cameras 13 are mounted, for example, on the respective left and right lateral surfaces of the housing 11. The detection cameras 13L and 13R may each include a plurality of (e.g., a pair of) imaging elements in order to capture an image that is capable of detecting the distance to an object and a normal line on the surface of the object. In such an instance, the imaging elements included in each detection camera 13 are disposed at a distance from each other. The detection cameras 13 capture images of lateral and downward field-of-view ranges of the user by using the imaging elements included in each detection camera 13, and output each image data derived from the captured images to the control section 14. In a certain example of the present embodiment, the detection cameras 13 repeatedly capture and output image data at predetermined time points (e.g., on a periodic basis). In the present embodiment, the detection cameras 13 implement first imaging means of the present invention.

The control section 14 includes a program control device, such as a central processing unit (CPU), and a storage device for storing a program. The program may be supplied on a computer-readable, non-transitory medium (digital versatile disc read-only memory (DVD-ROM), etc.) and stored in the storage device. The control section 14 executes the program to operate as described below.

The control section 14 receives the image data captured by the detection cameras 13, and detects, from the received image data, an image portion corresponding to the body portion of the user such as a shoulder or arm of the user. Based on information indicative of the detected image portion, the control section 14 estimates a possible existence range of a predetermined part of the body of the user, such as a hand of the user, within the image data captured by the front camera 12.

When estimating the possible existence range, the control section 14 may receive the image data captured by the detection cameras 13 and detect, from the received image data, temporal changes in an image portion corresponding to the body portion of the user such as a hand of the user. In such an instance, based on information identifying the detected temporal changes in the image portion, the control section 14 estimates the possible existence range of a predetermined part of the body of the user within the image data captured by the front camera 12.

Further, the control section 14 may detect an image portion corresponding to a predetermined part of the body of the user from the estimated possible existence range within the image data captured by the front camera 12. These operations of the control section 14 will be described in detail later.

The communication processing section 15 is an interface that communicates various data with the relay device 30. More specifically, the head-mounted device 10 transmits and receives data to and from the relay device 30 by establishing wireless communication such as wireless local area network (LAN) communication or Bluetooth (registered trademark) communication. In this instance, the communication processing section 15 includes a communication antenna and a communication module. Further, in accordance with instructions inputted from the control section 14, the communication processing section 15 transmits, for example, data on images captured by the front camera 12 and data outputted from the control section 14 to the relay device 30. Upon receiving, for example, data on a video signal from the relay device 30, the communication processing section 15 further performs a process, for example, of outputting the received data to the control section 14. In the present example, when the control section 14 outputs a video signal received from the relay device 30 to the video display processing section 32, video is presented to the user.

The video supply device 20 is an information processing device for supplying video that the head-mounted device 10 presents to the user. The video supply device 20 is, for example, a home-use game machine, a portable game machine, a personal computer, a smartphone, or a tablet. In one example of the present embodiment, the video supply device 20 receives data identifying a second part position of the body of the user from the head-mounted device 10 through the relay device 30, and performs processing based on the received data. In an example where the second part position is the position of a hand of the user, the video supply device 20 performs, for example, a process of producing staging effects to create a virtual reality environment. For example, the video supply device 20 determines the position of a hand of the user relative to an image outputted to the head-mounted device 10, generates video depicting that an object in the video is touched, and outputs the generated video to the head-mounted device 10.

The relay device 30 receives data on video supplied from the video supply device 20, and outputs a video signal based on the received data to the head-mounted device 10. The relay device 30 is connected wirelessly or wiredly to the head-mounted device 10. In one example of the present embodiment, the relay device 30 includes a video processor that converts video data supplied by the video supply device 20 to a video signal displayable on the head-mounted device 10, and outputs the resulting video signal to the head-mounted device 10. Further, the relay device 30 according to the present embodiment receives data from the head-mounted device 10 and outputs the received data to the video supply device 20.

Figure 2:
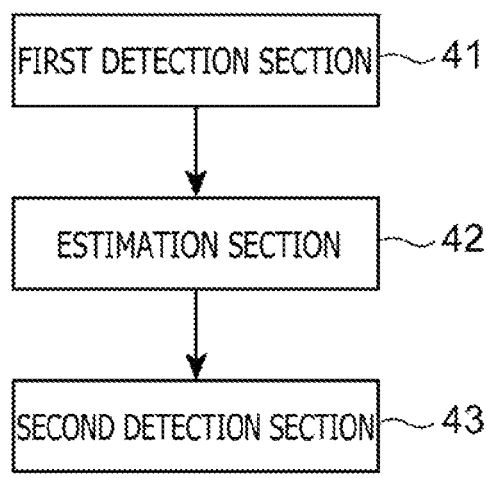
FIG. 2 is a block diagram illustrating an exemplary functional configuration of a head-mounted device according to an embodiment of the present invention.

Operations performed by the control section 14 in the head-mounted device 10 according to the present embodiment will now be described. In one example of the present embodiment, the control section 14 functionally includes a first detection section 41, an estimation section 42, and a second detection section 43 as illustrated in FIG. 2.

The first detection section 41 receives image data captured by the detection cameras 13, and detects, from the received image data, an image portion corresponding to the body portion of the user such as a shoulder, arm, or hand of the user. The first detection section 41 performs this operation each time the detection cameras output image data. For the sake of explanation, the following example assumes that image data captured by the front camera 12 is to be examined to detect a hand of the user as a predetermined part of the body of the user. In the present embodiment, the predetermined part of the body of the user is not limited to a hand of the user. An exemplary operation of the first detection section 41 will be described later.

In one example of the present embodiment, the first detection section 41 outputs predetermined part regional information. The predetermined part regional information is information detected from image data captured in each of the leftward and rightward directions of the housing 11 for the head-mounted device 10 in order to identify the region of the image portion of a hand. The information identifying the region of the image portion of a hand identifies a two-dimensional region representative of a hand imaging range within the image data of the detection cameras 13.

If the detection cameras 13 each include a plurality of imaging elements and are capable of detecting the distance to an object, the first detection section 41 may output depth information regarding each pixel included in the image data of the detection cameras 13. The depth information indicates the distance to a target imaged by a pixel. The depth information may be outputted, for example, as a depth map. The depth map is data having the same size as the image data outputted from the first detection section 41. The depth map is obtained by setting the value of a pixel of depth information in accordance with the value of distance to a target imaged by a pixel in the image data that corresponds to the pixel.

The estimation section 42 estimates, based on information indicative of an image portion detected by the first detection section 41, the possible existence range of a hand of the user, that is, a predetermined part of the body of the user, within the image data captured by the front camera 12.

Specifically, the estimation section 42 acquires camera parameters of the detection cameras 13. The camera parameters of the detection cameras 13 include coordinate information and vector information. The coordinate information indicates the relative positions of the front camera 12 and the detection cameras 13. The vector information indicates the relationship between the line-of-sight directions of the front camera 12 and detection cameras 13 (the vector information may be the difference between the line-of-sight direction vector of the front camera 12 and the line-of-sight direction vector of the detection cameras 13).

The estimation section 42 receives an input of predetermined part regional information in the detection cameras 13 from the first detection section 41. Then, by using the camera parameters of the detection cameras 13, the estimation section 42 converts the predetermined part regional information, which is inputted from the first detection section 41, to predetermined part regional information in the coordinate system of the image data captured by the front camera 12. Here, it is assumed that the unconverted regional information is expressed by the coordinate system of the detection cameras 13. Further, the coordinate system of the image data captured by the front camera 12 is, for example, an XY orthogonal coordinate system where the X-axis represents the horizontal axis direction of the image data captured by the front camera 12 and the Y-axis represents the vertical axis direction. In this conversion, a two-dimensional region expressed by the coordinate system of the detection cameras 13, which is identified by the predetermined part regional information inputted from the first detection section 41, is converted to a two-dimensional region expressed by the coordinate system of the front camera 12. The above-described coordinate system conversion process performed between two cameras is not described in detail here because it may adopt a well-known method.

In the present embodiment, the region expressed by the predetermined part regional information in the coordinate system of the image data captured by the front camera 12 need not always be included in the range of angles of view captured by the front camera 12.

Further, if a plurality of detection cameras 13 are used, the estimation section 42 receives an input of predetermined part regional information in each detection camera 13 from the first detection section 41, and converts the predetermined part regional information (expressed by the coordinate system of each detection camera 13) inputted from the first detection section 41 to predetermined part regional information in the coordinate system of the image data captured by the front camera 12 by using the camera parameters of each detection camera 13.

Let us assume as an example that the first detection section 41 is outputting predetermined part regional information identifying the region of an image portion of a hand that is detected from the image data captured by the detection cameras 13L and 13R, which are respectively disposed in the leftward and rightward directions of the housing 11 for the head-mounted device 10. This example assumes that the predetermined part regional information indicates a circle circumscribing the region of the detected hand (indicates the central coordinates and radius of the circle within the image data captured by the detection cameras 13).

Based on the information indicative of the circle representing the region of the user's hand that is obtained from the image data of each of detection cameras 13L and 13R, the estimation section 42 performs a process described below. The estimation section 42 virtually generates three-dimensional regions RL and RR shaped like a truncated cone (frustum) that has an axis of rotational symmetry corresponding to the line-of-sight direction of each detection camera 13 and a bottom surface corresponding to a circle indicative of the region of the user's hand. If the depth information is outputted from the first detection section 41, the three-dimensional regions RL and RR may be set based on the distance to the circle indicative of the region of the user's hand. In such an instance, the three-dimensional regions RL and RR may be substantially disk-shaped.

Subsequently, the estimation section 42 determines two-dimensional regions AL and AR in the coordinates of the image data captured by the front camera 12 that are occupied by the virtually generated three-dimensional regions RL and RR, and outputs information identifying the two-dimensional regions AL and AR. The two-dimensional regions AL and AR are calculated by performing a coordinate system conversion process between well-known cameras. In this instance, the two-dimensional regions AL and AR need not always be included within the angle of view of the front camera 12.

The second detection section 43 references information identifying the two-dimensional regions AL and AR that is outputted from the estimation section 42, and detects a hand of the user, that is, a predetermined part of the body of the user, from within the two-dimensional regions AL and AR identified by the referenced information. A method used by the second detection section 43 to detect the predetermined part may be different from a method used by the first detection section 41 to detect the predetermined part. For example, the second detection section 43 may use a well-known hand detection method such as a method of detecting a skin tone region.

The present embodiment attempts to detect a predetermined part from a region that is estimated and limited by the estimation section 42 as described above. This increases the efficiency of detecting the predetermined part such as a hand.

If at least either of the two-dimensional regions AL and AR, which are identified by the information outputted from the estimation section 42 as described above, is outside the angle of view of the front camera 12, the second detection section 43 may refrain from performing a process of detecting a predetermined part from the two-dimensional region outside the angle of view.

The second detection section 43 outputs to the video supply device 20 through the relay device 30 information indicative of the range of the user's hand detected from the image data captured by the front camera 12.

The video supply device 20 acquires data regarding the position and orientation of the head-mounted device 10, and obtains, based on the acquired data, the camera parameters of the front camera 12 of the head-mounted device 10 (information regarding the line-of-sight direction vector and angle of view of the front camera 12). The video supply device 20 then determines the three-dimensional position information regarding the user's hand by using the obtained camera parameters of the front camera 12 and the information indicative of the range of the user's hand within the image data captured by the front camera 12, which is inputted from the head-mounted device 10. This three-dimensional position information can be expressed as a value in a coordinate system (called a world coordinate system) where, for example, the center of coordinates represents the head of the user, the ζ-axis represents the left-right direction of the body of the user (the direction of a line segment formed when a coronal plane intersects a transverse plane), the η-axis represents the up-down direction of the body of the user (the direction of a line segment formed when the coronal plane intersects a sagittal plane), and the ζ-axis represents the depth direction of the body of the user (the direction of a line segment formed when the sagittal plane intersects the transverse plane).

In a certain example of the present embodiment, the head-mounted device 10 may include a motion sensor for measuring the position and orientation of the head-mounted device 10, and measure various information regarding the position, orientation, and motion of the head-mounted device 10. A motion sensor including, for example, a three-axis acceleration sensor, a three-axis gyroscope, a three-axis geomagnetic sensor, and an atmospheric pressure sensor may be used to make the above measurements. The results of the above measurements can be used to identify changes in the motion and orientation of the head-mounted device 10. More specifically, the result of detection by the acceleration sensor can be used to detect the inclination and parallel displacement of the head-mounted device 10 from the vertical direction. Further, the gyroscope and the geomagnetic sensor may be used to detect the rotary motion of the head-mounted device 10. Furthermore, the atmospheric pressure sensor may be used to detect the motion of the head-mounted device 10 in the vertical direction.

Consideration of Orientation of Head

The method of measuring the position and orientation of the head-mounted device 10 is not limited to the use of a motion sensor. If, for example, as illustrated in FIG. 3, the rotation angle of the head from the median line is the angle θ of the direction (the line-of-sight direction of the user watching straight forward) of the nose of the user from the coronal plane C (a plane containing a line segment joining the left and right shoulders), the angle θ can be obtained by detecting and using a region corresponding to a shoulder portion from the image data captured by the detection cameras 13.

Specifically, from the image data captured by the detection cameras 13, the head-mounted device 10 detects the image portion of a shoulder as a first part of the body of the user. The head-mounted device 10 then subjects the relevant image portion to ellipse fitting, regards the longitudinal axis direction of the ellipse as the direction of a straight line in the coronal plane, and uses the angle between the longitudinal axis direction and the horizontal axis of the image data as the rotation angle θ of the head from the axis formed by the median line (however 0≤θ≤90 degrees).

Figure 3:
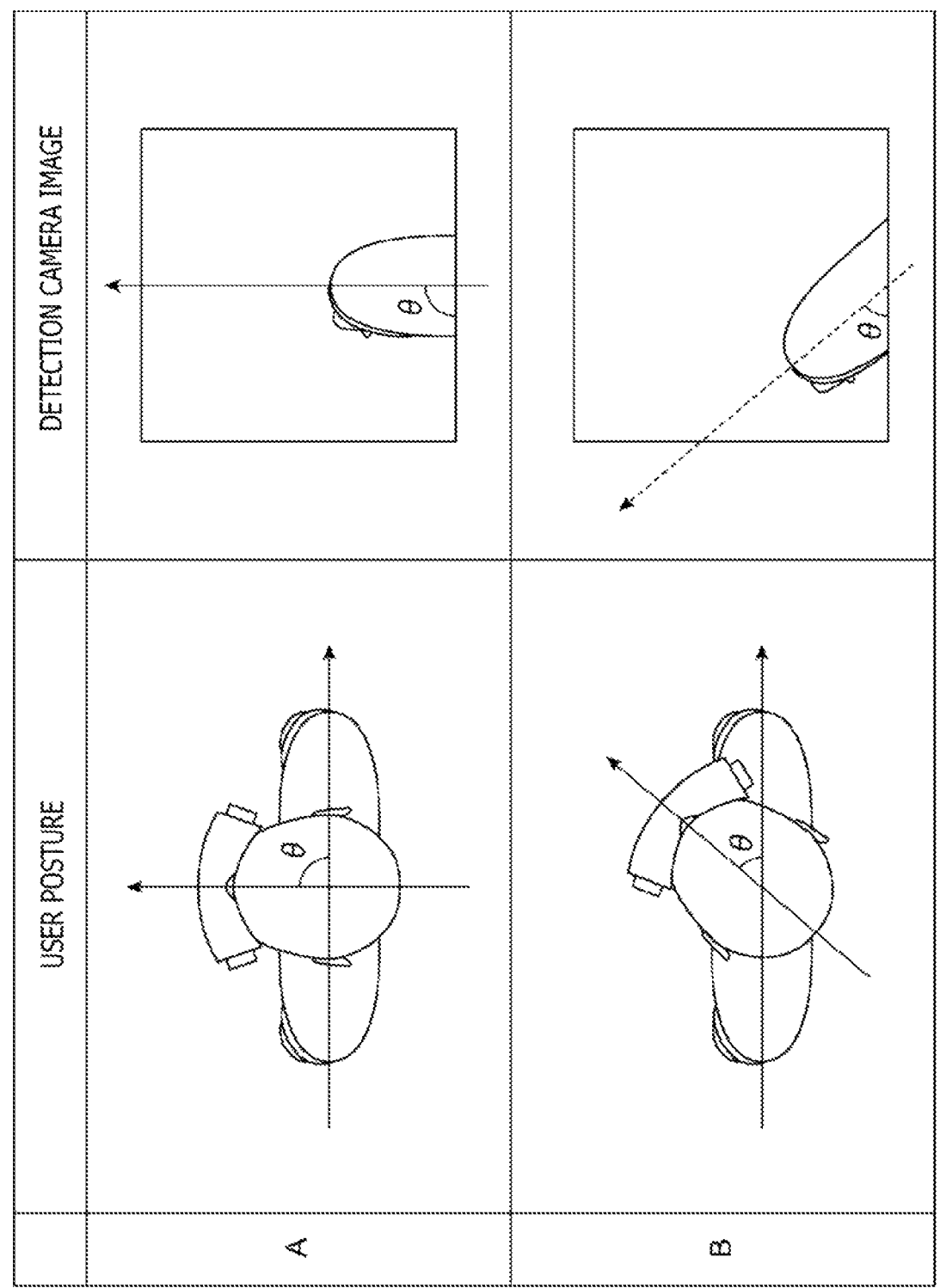
FIG. 3 is a diagram illustrating an exemplary operation of the head-mounted device according to an embodiment of the present invention that is performed to detect the direction of a head.

FIG. 3 depicts Examples (A) and (B). Example (A) illustrates a case where the rotation angle is determined to be 90 degrees when the user's head is oriented in the normal direction of the coronal plane (when the user faces forward). Example (B) illustrates a case where the rotation angle is determined to be θ from the image data of the detection cameras 13 when the user's head is inclined at an angle of θ from the coronal plane.

The field of view of either the left detection camera 13L or the right detection camera 13R may not include a shoulder of the user depending on the orientation of the head. However, the coronal plane is left-right symmetric with respect to the user. Therefore, when the rotation angle θ of the head is obtained from the image data acquired by either one of the left and right detection cameras 13L and 13R, the same rotation angle of the head is obtained from the image data acquired by the other detection camera.

When the head-mounted device 10 obtains information regarding the rotation angle θ of the head and transmits the obtained information to the video supply device 20, the video supply device 20 is able to calculate information regarding the position and orientation of the head-mounted device 10 (or more specifically, information regarding the position of the detection cameras 13). The video supply device 20 is then able to calculate information regarding the position of a hand or arm of the user or other part of the body of the user, which is detected by the head-mounted device 10 in accordance with the image data of the detection cameras 13.

Exemplary Operation of First Detection Section

Figure 4:
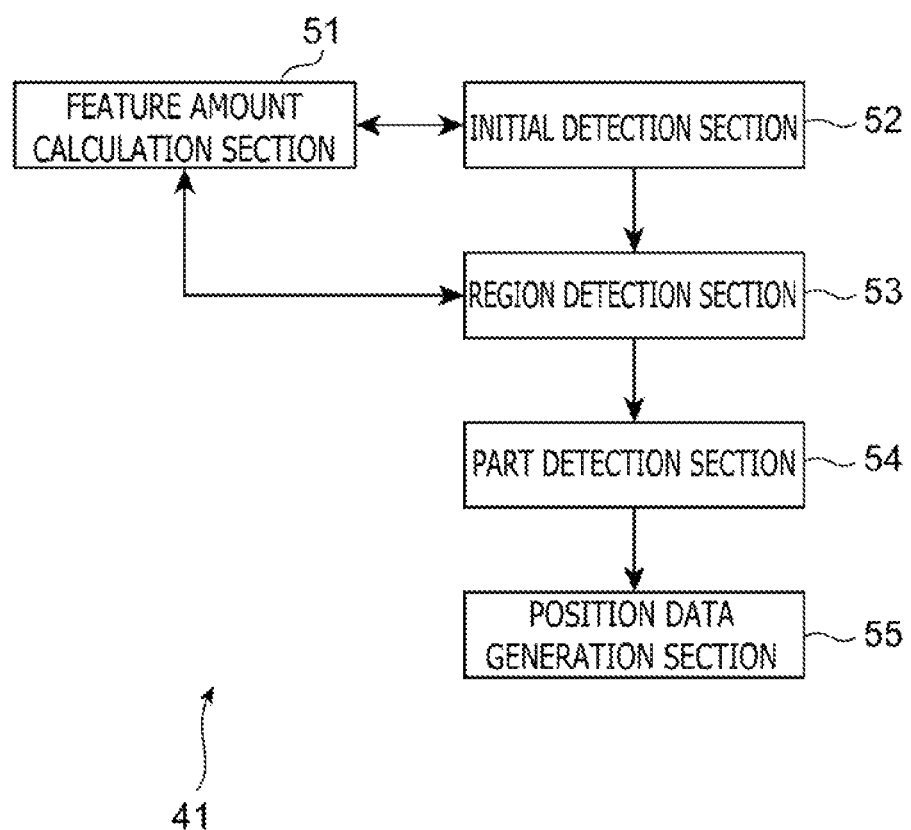
FIG. 4 is a block diagram illustrating an exemplary functional configuration of a first detection section of the head-mounted device according to an embodiment of the present invention.

An exemplary operation of the first detection section 41 will now be described. As illustrated in FIG. 4, the first detection section 41 includes, for example, a feature amount calculation section 51, an initial detection section 52, a region detection section 53, a part detection section 54, and a position data generation section 55.

The feature amount calculation section 51 receives an input of image data and calculates a predefined feature amount of each part of the image data (e.g., each pixel included in the image data). In one example of the present embodiment, the feature amount varies with the distance between an object imaged within a part of the image data and a detection camera 13 functioning as imaging means.

In the above instance, the feature amount calculation section 51 generates the depth map corresponding to each image data outputted, for example, from the detection camera 13, and outputs the generated depth map. The depth map is map image data having the same size as the image data outputted from the detection camera 13. In the depth map, the value of each pixel is defined based on the distance to a target imaged by the corresponding pixel in original image data. A detailed method of performing the above-described process of preparing a map of depth information from two or more sets of image data is well known and will not be described in detail here.

The initial detection section 52 receives image data captured by the detection cameras 13L and 13R, and detects a first image portion corresponding to the first part of the body of the user from each image data. Specifically, the first part is a user's body portion closest to the detection cameras 13, for example, a shoulder.

In the present example, the initial detection section 52 outputs respective image data acquired from the detection cameras 13L and 13R to the feature amount calculation section 51, and obtains depth map data corresponding to the image data captured by each of the detection cameras 13L and 13R.

The initial detection section 52 then uses the depth map data to detect, as an initial detection part, a portion of the user's body that has a predetermined shape (e.g., a tongue-like portion of a shoulder that has a substantially U-shaped circumscribing shape) and is positioned closest to each other within the image data captured by each of the detection cameras 13L and 13R.

Further, the initial detection section 52 regards, as the first image portion, a pixel portion that is included in each image data acquired from the detection cameras 13L and 13R and corresponds to the initial detection part, and a set of information identifying each pixel included in the first image portion.

The region detection section 53 references the depth map outputted from the feature amount calculation section 51, and identifies a region that includes pixels identified by the information outputted from the initial detection section 52 and continuously varies the predefined feature amount.

Figure 5:
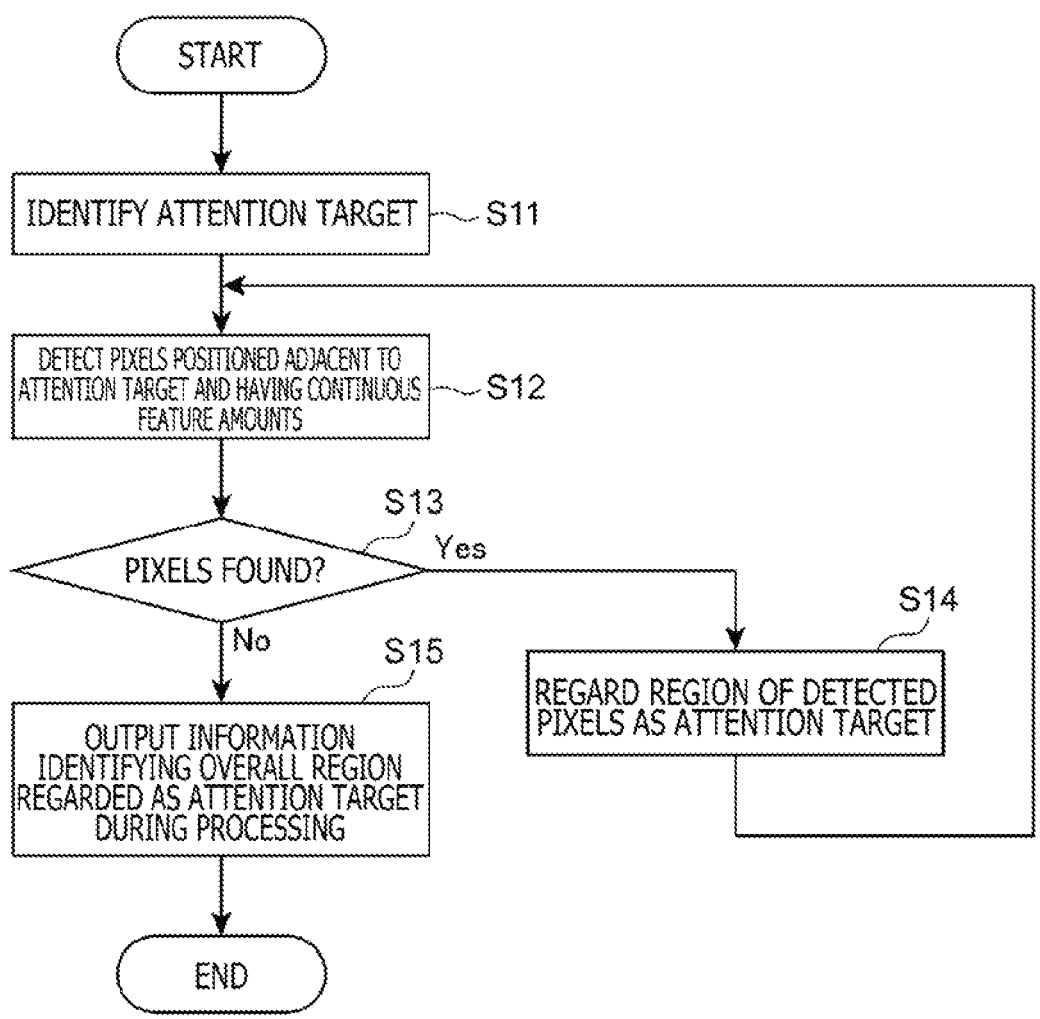
FIG. 5 is a flowchart illustrating an exemplary operation of a region detection section of the head-mounted device according to an embodiment of the present invention.

Specifically, the region detection section 53 performs a process illustrated in FIG. 5. More specifically, the region detection section 53 identifies, as an attention target, a portion of the depth map outputted from the feature amount calculation section 51 that corresponds to pixels identified by the information outputted from the initial detection section 52 (step S11). The region detection section 43 then references the feature amount of pixels included in the attention target (information regarding the distance from the detection cameras 13 in this instance) in order to search for pixels that are adjacent to the attention target but not included in a portion previously identified as an attention target and are lower than a predetermined threshold value for the difference between the feature amount of the pixels and the feature amount of a pixel included in the attention target (step S12).

The region detection section 53 checks whether any pixel is found by the search conducted in step S12 (step S13). If any pixel is found ("YES" at step S13), the region detection section 53 regards a portion formed of the found pixel (or formed of all the found pixels) as an attention target (step S14). Upon completion of step S14, the region detection section 53 returns to step S11 and continues with the process. That is to say, the region detection section 53 repeatedly performs a process of selecting, as a new attention target, one or more pixels that are adjacent to the attention target and can be evaluated as having a continuously varying feature amount. This results in identifying an enlarged region that includes a pixel portion selected as an initial attention target (a portion corresponding to a first region) and has a continuously varying feature amount.

If, in step S13, the result of the search indicates that no pixel is found ("NO" at step S13), the region detection section 53 identifies, as a region having a continuously varying feature amount, a region of image portions previously selected as the attention target in steps S11 and S14, and outputs information indicative of the identified region (step S15). Here, the information indicative of a region may be information identifying pixels included in the region (a set of coordinate information regarding the pixels).

The part detection section 54 detects, from an image portion in a region identified by the information outputted from the region detection section 53, a second image portion corresponding to a predetermined part of the user's body that is different from the initial detection part.

For example, the part detection section 54 detects, as the second image portion corresponding to a second part, the longitudinal end of the region identified by the information outputted from the region detection section 53. More specifically, the part detection section 54 detects a rectangle circumscribing the region identified by the information outputted from the region detection section 53, and compares the horizontal axis length of the detected rectangle with the vertical axis length. As the result of the comparison, the part detection section 54 regards the axial direction of the horizontal axis or of the vertical axis, whichever is longer, as the longitudinal direction. The part detection section 54 then selects, as a target pixel, a pixel in the above-mentioned region in contact with a side that is among opposing longitudinal ends (sides orthogonal to the longitudinal direction) and positioned away from the center of gravity of the initial detection part detected by the initial detection section 52. Here, the center of gravity of the initial detection part denotes the center of gravity of pixels in an image portion corresponding to the initial detection part. More specifically, if the coordinates of the pixels are $(x_i, y_i)$ ($i=1, 2, \ldots, N$), the center of gravity of the initial detection part can be calculated by dividing its average $\Sigma (x_i, y_i)$ by $N$.

Alternatively, the part detection section 54 selects, as a target pixel, a pixel that is positioned farthest from the center of gravity of an image portion that is within a region identified by the information outputted from the region detection section 53 and corresponds to the first region.

The part detection section 54 then sets a virtual circle that is centered around the target pixel and has a radius defined by a predetermined method. The radius may be, for example, predetermined or defined based on the distance between a selected target pixel and the detection cameras 13 from the information of the depth map (e.g., the radius may be decreased with an increase in the distance from the detection cameras 13).

The part detection section 54 detects, as the second image portion corresponding to the second part, pixels that are included in the virtual circle and positioned within a region identified by the information outputted from the region detection section 53.

The position data generation section 55 generates data identifying the second image portion detected by the part detection section 54, and outputs the generated data. More specifically, the position data generation section 55 outputs a set of information identifying the pixels included in the second image portion detected by the part detection section 54 (a set of coordinate information regarding each pixel).

Detection of Shoulders

The head-mounted device 10 according to the present embodiment may further include an infrared light-emitting device, a light-emitting diode (LED) flashlight, or other light-emitting means on each of the left and right of the housing 11. In such an instance, the initial detection section 52 may detect the initial detection part of the user's body (e.g., a shoulder of the user) by illuminating such light-emitting means and capturing an image with the detection cameras 13.

In the present example, an image of the part of the user's body in the vicinity of the light-emitting means, such as a shoulder of the user, is captured by the light emitted from the light-emitting means in an overexposed state (so-called blown-out highlights). Thus, the initial detection section 52 may detect the first region corresponding to the initial detection part of the user's body by detecting an overexposed region from the image data that is captured by the detection cameras 13 when light is emitted from the light-emitting means.

Further, in the present embodiment, once a detection is achieved, without detecting the closest part or an overexposed part each time, the initial detection section 52 may track the motion of the initial detection part of the user's body from the image data captured by the detection cameras 13 and identify the first region where the initial detection part is imaged. The above-mentioned motion tracking process is not described in detail here because it may adopt a well-known method.

Alternative Operations of First Detection Section and Estimation Section

The foregoing description assumes that, when the control section 14 operates as the estimation section 42, the three-dimensional regions RL and RR are virtually generated based on information indicative of a circle representing the region of the user's hand identified within the image data of each of detection cameras 13L and 13R. However, the user's hand is not always within the angles of view of the detection cameras 13.

In consideration of a case where the user's hand is not included in the image data captured by the detection cameras 13, the first detection section 41 and the estimation section 42 may perform the following operations.

The first detection section 41 receives image data captured by the detection cameras 13 and detects an arm of the user from the image data. The first detection section 41 performs this operation each time the detection cameras output image data. More specifically, when selected pixels (one or more selected pixels) are adjacent to an attention target during the operation of the region detection section 53 and differ in feature amount from a pixel included in the attention target by a value smaller than a predetermined value, the first detection section 41 calculates information indicative of the direction of a line segment joining the center of gravity of pixels currently forming the attention part to the center of gravity of the newly selected pixels.

At first (at a stage where a region corresponding to the first part is an attention target), the first detection section 41 records information indicative of the calculated direction of the line segment and issues label information (it is assumed here that the label information is a predetermined initial value, for example, the numerical value "1"). The first detection section 41 then stores information identifying the newly selected pixels in association with the label information.

Subsequently, each time the information indicative of the direction of the line segment is calculated, the first detection section 41 compares the previously recorded information indicative of the direction of the line segment with the calculated information indicative of the direction of the line segment. If the difference indicated by the result of comparison is smaller than a predetermined angle threshold value (the crossing angle between the directions of the line segments may be regarded as the difference since the compared sets of information are vectors and then the difference may be determined by dividing an inner product by the product of the magnitudes of the vectors), the first detection section 41 records the currently calculated information indicative of the direction of the line segment, adds the recorded information to the information identifying pixels associated with the previously issued label information, and stores information identifying the newly selected pixels.

If the difference is greater than the predetermined angle threshold value, the first detection section 41 records the currently calculated information indicative of the direction of the line segment, issues new label information (the new label information may be obtained, for example, by incrementing a numerical value representative of the prevailing label information by one), and stores information identifying the newly selected pixels in association with the issued label information.

By repeatedly performing the above process until no more pixels are selected, the first detection section 41 identifies a region where the feature amount continuously varies, and performs labeling for each part that linearly varies within the identified region. If, in the present example, a user's elbow or wrist is not bent, pixels corresponding to the whole arm including a hand as an arm portion can be labeled. If the user's elbow or wrist is bent, pixels corresponding, for example, to each of upper and lower arms, are differently labeled.

In the above instance, the estimation section 42 sets, as a region where a hand should exist, a predetermined three-dimensional region near the end of the arm detected by the first detection section 41 (the region of a lower arm to which the last-issued label is attached if different labels are attached to the upper and lower arms, or the region of the whole arm if different labels are not attached to the upper and lower arms). Specifically, the estimation section 42 generates, as a three-dimensional region where a hand should exist, a virtual spherical region S in contact with the end of the arm portion (or includes the end of the arm portion) and having a predetermined radius. The predetermined radius may be a predefined constant value or defined based on the value of a pixel on the depth map corresponding to a pixel at the end of the detected arm portion (this value varies with the distance between the detection cameras 13 and the end of the arm portion). The radius may be decreased with an increase in the distance between the detection cameras 13 and the end of the arm portion, which is obtained, for example, from the depth map.

Subsequently, the estimation section 42 determines two-dimensional regions AL and AR that are in the coordinates of image data captured by the front camera 12 and occupied by the virtually generated three-dimensional region, and outputs information identifying the two-dimensional regions AL and AR. The two-dimensional regions are calculated by performing a well-known coordinate system conversion process between cameras. In this instance, the two-dimensional regions AL and AR need not always be included within the angle of view of the front camera 12.

In the above example, even if a hand is not imaged within the angles of view of the detection cameras 13 or is hidden by an arm depending on the direction of the arm, the range of the hand can be estimated as far as the arm is imaged.

A method of identifying the arm portion is not limited to the above exemplary one. The arm portion may alternatively be identified in the following manner. If the control section 14 detects the rotation angle δ of the head from an image of a shoulder, the coronal plane is generally left-right symmetric with respect to the user. Therefore, when the rotation angle δ of the head is obtained from the image data acquired by either one of the left and right detection cameras 13L and 13R, the same rotation angle of the head is obtained from the image data acquired by the other detection camera. Then, based on the camera parameters of detection cameras 13L and 13R, information identifying a region where a left shoulder is imaged by one detection camera 13 (for example, the detection camera 13L), and the rotation angle of θ of the head, the estimation section 42 acquires, from the coordinate system of image data acquired by the other detection camera 13R, information identifying a region where a right shoulder should exist (it does not matter whether the right shoulder is imaged within the prevailing angle of view of the detection camera 13R). In this case, the possible existence range of a right hand is centered around the right shoulder and within a virtual sphere having a radius equal to the length of an arm (or within a hemisphere acquired by cutting the sphere in the coronal plane and obtaining only the body's front portion in consideration of the movable range of a shoulder joint/elbow joint in a general posture employed, for example, for gaming). Therefore, the estimation section 42 may regard the virtual sphere (or the hemisphere) as a virtual three-dimensional region, determine two-dimensional regions AL and AR that are in the coordinates of image data captured by the front camera 12 and occupied by the virtual three-dimensional region, and output information identifying the two-dimensional regions AL and AR.

Further, in the present example, the shape of the virtual three-dimensional region may be further changed depending on whether an arm or a shoulder is imaged by the other detection camera 13R or not. Specifically, if an arm or a shoulder is imaged by the other detection camera 13R, it is estimated that the elbow joint of a right arm and a right wrist are positioned above the detection camera 13R. Therefore, the estimation section 42 divides a virtual sphere centered around the right shoulder and having a radius equal to the length of the arm (or a hemisphere acquired by cutting the virtual sphere in the coronal plane and obtaining only the body's front portion) into a portion above the position of the detection camera 13R (this portion is referred to as the upper partial region) and a portion below the position of the detection camera 13R (this portion is referred to as the lower partial region). Subsequently, if an arm or a shoulder is imaged by the detection camera 13R, the estimation section 42 regards the lower partial region, which is obtained by the division, as a virtual three-dimensional region, determines the two-dimensional regions AL and AR that are in the coordinates of image data captured by the front camera 12 and occupied by the virtual three-dimensional region, and outputs information identifying the two-dimensional regions AL and AR.

If, by contrast, neither an arm nor a shoulder is imaged by the detection camera 13R, the estimation section 42 regards the upper partial region, which is obtained by the division, as a virtual three-dimensional region, determines the two-dimensional regions AL and AR that are in the coordinates of image data captured by the front camera 12 and occupied by the virtual three-dimensional region, and outputs information identifying the two-dimensional regions AL and AR.

Temporal Changes

Further, the estimation section 42 successively receives information regarding the result of detection of a predetermined part of the user from the first detection section 41, and successively determines, based on the received pieces of information, a two-dimensional region that is in the coordinates of image data captured by the front camera 12 and occupied by the predetermined part. The estimation section 42 then obtains information indicative of temporal changes in the two-dimensional region. Specifically, the information indicative of the temporal changes can be obtained by performing a well-known process, such as an optical flow process, on the successively determined two-dimensional region.

Based on the obtained information regarding the two-dimensional region and on the information regarding its temporal changes, the estimation section 42 estimates information regarding the two-dimensional region at a predetermined future time point (e.g., at a time point several frames later according to the frame rate of the front camera 12). This estimation is not described in detail here because it can be made by applying a well-known method of estimating the future position of a movable body. The estimation section 42 outputs information indicative of the result of estimation of the two-dimensional region at a future time point obtained here.

Based on the information regarding the two-dimensional region at the future time point, which is acquired through the estimation by the estimation section 42, the second detection section 43 detects a user's hand, which is a predetermined part of the user's body, from the two-dimensional region identified by the acquired information. In the present example, if a region where the hand exists is currently outside the angle of view of the front camera 12 and will move into the angle of view at the predetermined future time point, an attempt is made to detect a predetermined part, such as the user's hand, from the moved region. Therefore, when the predetermined part moves into the angle of view of the front camera 12 and is imaged by the front camera 12, the position of the predetermined part in the image data captured by the front camera 12 can be promptly identified because the position at which the predetermined part begins to be imaged is estimated in advance.

Examples of Operations

The head-mounted device 10 according to an example of the present embodiment has the above-described configuration and performs the following operations. At each predetermined time point (e.g., on a periodic basis), the head-mounted device 10 causes the detection cameras 13 to let the imaging elements capture an image of a downward view from the lateral sides of the user wearing the head-mounted device 10.

For each pixel of obtained image data, the head-mounted device 10 calculates, as the feature amount, information indicative of the distance between an object imaged by the pixel and the detection cameras 13, and then generates the depth map. Next, the head-mounted device 10 uses the image data and the depth map to detect from the image data an image portion where a user's hand exists.

Based on information indicative of the detected image portion, the head-mounted device 10 estimates the possible existence range of the user's hand, which is a predetermined part of the user's body, in the coordinates of image data captured by the front camera 12.

The head-mounted device 10 then references information indicative of the estimated possible existence range of the user's hand, and detects the user's hand, which is the predetermined part of the user's body, from a two-dimensional region identified by the associated information included in the image data captured by the front camera 12. The head-mounted device 10 outputs the image data captured by the front camera 12 and information detected from the image data and indicative of the range of the user's hand to the video supply device 20 through the relay device 30.

Specifically, if the posture of the user is as illustrated at (A) of FIG. 6 (the posture of the user indicates that the user is touching a computer keyboard), the image data captured within a field of view X of the detection camera 13L is as illustrated at (X) of FIG. 6.

The head-mounted device 10 detects the image portion of an arm from the image data by using, for example, the depth map, and detects the image portion (C) of a hand from the end of the detected image portion of the arm. The head-mounted device 10 then converts the image portion (C) of the image data captured by the detection camera 13L to an image portion (C') in the coordinates of the front camera 12. That is to say, calculations are performed to determine the image portion (C') in the coordinates of the front camera 12 that corresponds to the image portion (C) of the image data captured by the detection camera 13L. The head-mounted device 10 attempts to detect a user's hand from the image portion (C') of the image data captured by the front camera 12.

Further, examples of operations performed by the head-mounted device 10 when the posture of the user is as illustrated at (B) of FIG. 6 (the posture of the user indicates that the user is gripping a virtual bow with a right hand and projecting the virtual bow forward from the user's body) will now be described. The description will be given with respect to two different cases, namely, case (I) and case (II). In case (I), a left arm is extended rearward from the user's body. In case (II), the left arm is extended forward in order to pull a bowstring of the virtual bow.

First of all, when the left arm is extended rearward from the user's body (I), the image data X(I) outputted from the detection camera 13L indicates that only a shoulder R is imaged. Here, the head-mounted device 10 determines the rotation angle of the head (the relative angle between a line joining the left and right shoulders and a line joining the center of the head to the nose) θ, for example, by subjecting an image portion of the shoulder R to ellipse fitting and detecting its longitudinal axis direction. Here, as the angle θ depicted at X(I) in FIG. 6 is obtuse, the head-mounted device 10 assumes that the left arm is oriented rearward from the user's body (the left arm is not in front of the user's body). Therefore, the head-mounted device 10 does not detect the image portion of a hand in the image data X(I) outputted from the detection camera 13L. That is to say, in the example of (I) at (B) of FIG. 6, the image portion of the user's hand is not detected from the image data X(I) outputted from the detection camera 13L.

In the above case, the head-mounted device 10 cannot obtain an image portion in the coordinates of the front camera 12 that corresponds to the image portion of the user's hand detected from the image data X(I) outputted from the detection camera 13L. Therefore, the head-mounted device 10 does not detect the user's hand (left hand) on the side toward the detection camera 13L (Y(I) of FIG. 6).

Meanwhile, when the left arm of the user is extended forward in order to pull the bowstring of the virtual bow (II), the arm is imaged by the image data X(II) outputted from the detection camera 13L. Therefore, the image portion (C) of a hand is detected from the end of the arm. The head-mounted device 10 then converts the image portion (C) in the image data captured by the detection camera 13L to the image portion (C') in the coordinates of the front camera 12. That is to say, calculations are performed to obtain the image portion (C') in the coordinates of the front camera 12 that corresponds to the image portion (C) in the image data captured by the detection camera 13L. The head-mounted device 10 attempts to detect the user's hand from the image portion (C'), which is among the image data captured by the front camera 12 (Y(II) of FIG. 6).

The video supply device 20 receives an input of the image data captured by the front camera 12 of the head-mounted device 10 and an input of information identifying the image portion of the hand, which is detected from the inputted image data, separately acquires data regarding the position and orientation of the head-mounted device 10, and obtains three-dimensional position information regarding the position of the user's hand from the above sets of data. The obtained three-dimensional position information can be expressed as a value in a coordinate system that has, for example, the user's head at its center, has an X-axis representing the left-right direction of the user's body (the direction of a line segment obtained when the coronal plane intersects the transverse plane), has a Y-axis representing the up-down direction (the direction of a line segment obtained when the coronal plane intersects the sagittal plane), and has a Z-axis representing the depth direction (the direction of a line segment obtained when the sagittal plane intersects the transverse plane).

As a process to be performed in the video supply device 20, a well-known process of converting a camera coordinate system to a world coordinate system may be performed based on the camera parameters of the front camera 12 included in the head-mounted device 10 and on the data regarding the position and orientation of the head-mounted device 10.

Exemplary Modification

The foregoing description assumes that the feature amount calculated by the feature amount calculation section 51 in the control section 14 indicates the distance between the detection cameras 13 and an imaged target. However, the present embodiment is not limited to such an indication of the feature amount. Alternatively, the feature amount may be information indicative of the normal direction of a target imaged as an image portion. In such an instance, a structure-light projecting device (not depicted), such as a device using a Moiré method, may be disposed on the housing 11 for the head-mounted device 10 in order to let the detection cameras 13 capture image data by projecting structured light onto the user's body. When means for projecting structured light is employed, the information regarding the normal direction can be acquired by making three-dimensional measurements based on a structured-light projection method. The information regarding the normal direction may alternatively be acquired by any other well-known three-dimensional measurement method.

Even when the information regarding the normal line is used as described above, as is the case with exercising a method of using the distance from the detection cameras 13, the region of a hand imaged in the image data captured by the detection cameras 13 can be detected by detecting a region where the normal direction is continuous. The reason is that, as far as a shoulder is detected, the normal direction continuously varies from the shoulder through an upper arm, a lower arm to a hand (the difference in the information regarding a measured normal direction between mutually adjacent pixels is smaller than a predetermined threshold value).

Further, when a region where the normal direction is continuous is to be detected as described above, the region of a hand placed, for instance, on a desk can be detected in distinction from the surface of the desk because the normal line of a lateral surface of the hand is not continuous with the normal line of the surface of the desk.

Arrangement of Cameras

The foregoing examples of the present embodiment assume that the detection cameras 13 are disposed on the left and right lateral surfaces of the housing 11. However, as far as a portion corresponding to the first part, such as a shoulder of the user, can be imaged, the detection cameras 13 need not always be disposed on the left and right lateral surfaces of the housing 11. For example, the detection camera 13L may be disposed on the lower leftmost end of the housing 11, and the detection camera 13R may be disposed on the lower rightmost end of the housing 11.

The present embodiment identifies, for example, the position of a hand of a user in accordance with image data captured by the detection cameras 13. Therefore, the present embodiment is capable of detecting the motion of the user without requiring any operation of a controller.

REFERENCE SIGNS LIST

1 Information processing system
10 Head-mounted device
11 Housing
12 Front camera
13 Detection camera
14 Control section
15 Communication processing section
20 Video supply device
30 Relay device
31 Video display unit
32 Video display processing section
41 First detection section
42 Estimation section
43 Second detection section
51 Feature amount calculation section
52 Initial detection section
53 Region detection section
54 Part detection section
55 Position data generation section

The invention claimed is:

1. A head-mounted device comprising:
a housing that is to be mounted on the head of a user;
first imaging means and second imaging means that are mounted on the housing to capture images from different angles of view;
detection means for receiving an image captured by the first imaging means and detecting an image portion corresponding to a body portion of the user from the received image; and
estimation means for estimating, based on information indicative of the detected image portion, a possible existence range of a predetermined part of the body of the user within an image captured by the second imaging means,
wherein an image portion corresponding to the predetermined part of the body of the user is detected from the estimated possible existence range within the image captured by the second imaging means.

2. The head-mounted device according to claim 1, wherein a detection method adopted by the detection means to detect the predetermined part is different from a detection method adopted to detect the predetermined part from the image captured by the second imaging means.

3. A head-mounted device comprising:
a housing that is to be mounted on the head of a user;
first imaging means and second imaging means that are mounted on the housing to capture images from different angles of view;
detection means for receiving an image captured by the first imaging means and detecting temporal changes in an image portion corresponding to a body portion of the user from the received image; and
estimation means for estimating, based on information indicative of the temporal changes in the image portion, a possible existence range of a predetermined part of the body of the user within an image captured by the second imaging means,
wherein an image portion corresponding to the predetermined part of the body of the user is detected from the estimated possible existence range within the image captured by the second imaging means.

4. The head-mounted device according to claim 3, wherein a detection method adopted by the detection means to detect the predetermined part is different from a detection method adopted to detect the predetermined part from the image captured by the second imaging means.

5. A non-transitory computer-readable information storage medium for storing a program for a head-mounted device that is connected to a computer and includes a housing, first imaging means, and second imaging means, the housing being to be mounted on the head of a user, the first and second imaging means being mounted on the housing to capture images from different angles of view, the program for the computer, including: by detection means, receiving an image captured by the first imaging means and detecting an image portion corresponding to a body portion of the user from the received image; and by estimation means, estimating, based on the detected image portion, a possible existence range of a predetermined part of the body of the user within an image captured by the second imaging means.

* * * * *